US007166269B2

(12) United States Patent
Tanaka et al.

(10) Patent No.: US 7,166,269 B2
(45) Date of Patent: Jan. 23, 2007

(54) METHOD FOR PRODUCING HYDROGEN GAS

(75) Inventors: Yoshirou Tanaka, 9-8, Kofuen 1-chome, Nishinomiya-shi, Hyogo 662-0832 (JP); Seizo Kato, Tsu (JP)

(73) Assignee: Yoshirou Tanaka, Hyogo (JP)

( * ) Notice: Subject to any disclaimer, the term of this patent is extended or adjusted under 35 U.S.C. 154(b) by 387 days.

(21) Appl. No.: 10/468,750

(22) PCT Filed: Feb. 20, 2002

(86) PCT No.: PCT/JP02/01512

§ 371 (c)(1), (2), (4) Date: Feb. 27, 2004

(87) PCT Pub. No.: WO02/066368

PCT Pub. Date: Aug. 29, 2002

(65) Prior Publication Data

US 2005/0276747 A1 Dec. 15, 2005

(30) Foreign Application Priority Data

Feb. 22, 2001 (JP) ............................ 2001-046716

(51) Int. Cl.

| | |
|---|---|
| ***C01B 3/08*** | (2006.01) |
| ***C01B 3/06*** | (2006.01) |
| ***C01B 3/04*** | (2006.01) |
| ***C01B 3/50*** | (2006.01) |

(52) U.S. Cl. .................................... 423/657; 423/658.3

(58) Field of Classification Search ..................... None
See application file for complete search history.

(56) References Cited

U.S. PATENT DOCUMENTS

| | | | | |
|---|---|---|---|---|
| 3,864,466 | A * | 2/1975 | Trichet et al. | 423/647.7 |
| 4,038,035 | A * | 7/1977 | Ergenc et al. | 422/189 |
| 4,123,508 | A * | 10/1978 | Mandrin | 423/580.2 |
| 2005/0276747 | A1* | 12/2005 | Tanaka et al. | 423/657 |

FOREIGN PATENT DOCUMENTS

| | | |
|---|---|---|
| JP | 2002-12992 | * 1/2002 |
| JP | 2002-293501 | * 10/2002 |

OTHER PUBLICATIONS

Translation of JP 2002-12992, total of 8 pages.*
CSJ, "Shin Jikken Kagaku Koza-8 Muki Kagobutsu no Gosei I," The Chemical Society of Japan, Dec. 20, 1076, p. 36-37, Published by Maruzen Co., Ltd.
M. Cannon Sneed et al., "Comprehensive Inorganic Chemistry," vol. 6, 196-197, Reprinted Apr. 1960.

* cited by examiner

*Primary Examiner*—Colleen P. Cooke
(74) *Attorney, Agent, or Firm*—The Webb Law Firm

(57) ABSTRACT

A monometal (1) is contacted with deuterated acidic water solution (2) in which at least some of hydrogen atoms contained in acidic water solution are substituted for deuterium atoms, thereby to generate hydrogen gas. With this, a great amount of hydrogen gas can be generated in a short period of time.

2 Claims, 4 Drawing Sheets

1
—2—

(a)

1A
1B
—2—

(b)

1
1
—2—

METHOD FOR PRODUCING HYDROGEN GAS

TECHNICAL FIELD

The present invention relates to a method for producing hydrogen gas.

BACKGROUND ART

Hydrogen gas can be generated by e.g. immersing metal in acidic water solution. The sole conventional concept was generating hydrogen gas by immersing metal in acidic water solution comprising normal water and an acid component.

With the above-described conventional method, however, the generation rate of hydrogen is low and it is not possible to generate a large amount of hydrogen gas in a short period of time. Hence, this method requires room for improvement, if it is to be put into actual use for supplying various kinds of hydrogen gas.

The present invention has been made in view of the above-described state of the art. The primary object of the invention is to provide a method for producing hydrogen gas which method allows a great amount of hydrogen gas to be generated in a short period of time.

DISCLOSURE OF THE INVENTION

According to a method relating to claim 1, as illustrated in FIG. 1, the method comprises the step of contacting a monometal 1 with deuterated acidic water solution 2 in which at least some of hydrogen atoms contained in acidic water solution are substituted for deuterium atoms, thereby to generate hydrogen gas.

With the above method relating to claim 1, the monometal is contacted with the deuterated acidic water solution in which at least some of hydrogen atoms contained in acidic water solution are substituted for deuterium atoms. Then, the deuterated component contained in the deuterated acidic water solution activates the oxidation reaction of the monometal exposed to this deuterated acidic water solution, thus promoting the generation of hydrogen gas due to this oxidation reaction. As a result, a great amount of hydrogen gas can be generated in a short period of time. According to a presumable theory, at the portion of the monometal contacting the deuterated acidic water solution, the monometal is dissolved by the deuterated acidic water solution, while the reaction for generation of the hydrogen gas from the monometal portion contacting the deuterated acidic water solution is activated by the deuterated component, whereby the generation of the hydrogen gas is further promoted, thereby generating a great amount of hydrogen gas in a short period of time.

Incidentally, it is needless to say that the deuterated acidic water solution in which at least some of the hydrogen atoms contained in acidic water solution are substituted for deuterium atoms contains a greater amount of deuterium atoms than naturally present.

According to a method relating to claim 2, in the method of claim 1, said acidic water solution contains at least one kind of acid selected from the group consisting of citric acid, glycine, cinnamic acid, succinic acid, salicylic acid, formic acid, glutamic acid, ascorbic acid, oxalic acid, tartaric acid, lactic acid, acetic acid, sulfuric acid, hydrochloric acid, and nitric acid.

With the above method relating to claim 2, by using, as the acidic water solution, a relatively easily available acidic solution of e.g. citric acid, glycine, cinnamic acid, succinic acid, salicylic acid, formic acid, glutamic acid, ascorbic acid, oxalic acid, tartaric acid, lactic acid, acetic acid, sulfuric acid, hydrochloric acid, and nitric acid, the hydrogen gas can be produced easily as well as economically.

BEST MODE OF EMBODYING THE INVENTION

Next, an embodiment of a method for producing hydrogen gas relating to the present invention will be described.

Figure 1:
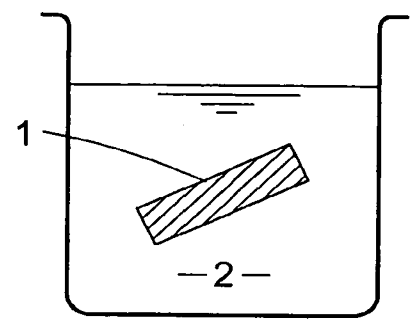
FIG. 1 is an explanatory view in partial section showing an example of contacting condition between a deuterated acidic water solution and a monometal.
Figure 2:
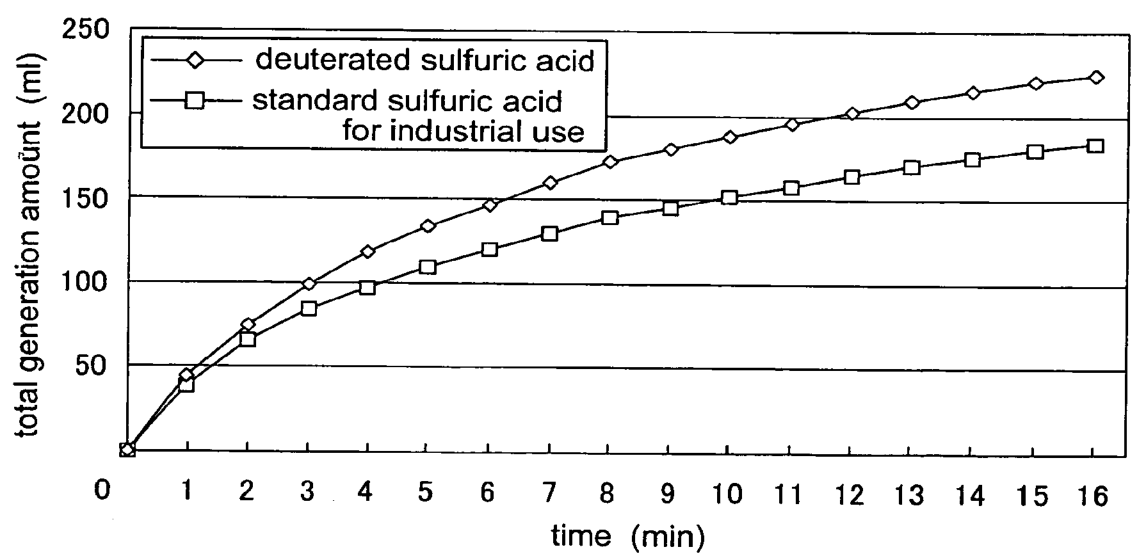
FIG. 2 is a graph showing changes over time in the hydrogen generation amount in comparison between a case using the deuterated sulfuric acid water solution and Mg metal and a further case using standard sulfuric acid water solution for industrial use and the Mg metal.
Figure 3:
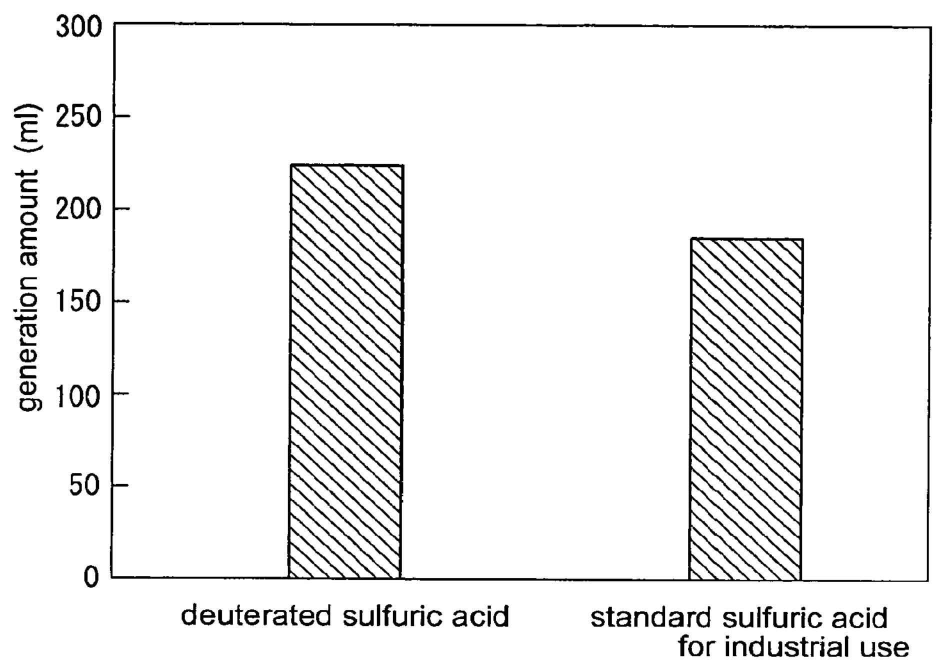
FIG. 3 is a graph showing hydrogen gas generation amounts per a predetermined unit time in comparison between the case using the deuterated sulfuric acid water solution and Mg metal and the further case using standard sulfuric acid water solution for industrial use and the Mg metal.

As an example of deuterated acidic water solution, there was employed deuterated sulfuric acid water solution in which some of hydrogen atoms contained in sulfuric acid water solution were substituted for deuterium atoms. And, as an example of monometal, magnesium metal (to be referred to as "Mg metal" hereinafter) 1 was employed. As an example, as illustrated in FIG. 1, into 500 ml of the deuterated sulfuric acid water solution 2 (pH=0.4), the Mg metal (a plate-like metal piece having a surface area of about 15.7 $cm^2$) 1 was immersed to generate hydrogen gas. In this, FIG. 2 shows the relationship between the total amount (yield) of the hydrogen gas generated and the time lapsed and FIG. 3 shows the generation amount of hydrogen gas during period of 16 minutes after the immersion of the Mg metal. For comparison, these figures also show the results of a further case in which Mg metal (a plate-like metal piece having a surface area of about 16.0 $cm^2$) was immersed in standard sulfuric acid water solution for industrial use (pH=0.4).

As can be understood from FIGS. 2 and 3, compared with the case of immersing the piece in the standard sulfuric acid water solution for industrial use, the generation rate of the hydrogen gas was higher from an early stage of the process in the case of immersing the piece in the deuterated sulfuric acid water solution. Specifically, within the initial 16 minutes period, as much as about 225 ml of hydrogen gas could be generated in the case of using the deuterated sulfuric acid water solution, compared with the case of using the standard industrial sulfuric acid water solution which yielded only about 184 ml. Hence, it was confirmed that the use of the deuterated sulfuric acid water solution contributed to increase in the generation amount of the hydrogen gas at the early stage.

Incidentally, the deuterated sulfuric acid water solution can be prepared by appropriately using any of a variety of methods such as incorporating such substance as heavy water, deuterium sulfate, deuterium sulfide, etc. so that at least some of the hydrogen atoms contained in the deuterated sulfuric acid water solution are substituted for deuterium atoms and the resultant solution contains a greater amount of deuterium atoms than naturally present.

As described above, with the hydrogen gas producing method relating to the present invention, it becomes possible to generate a great amount of hydrogen gas in a short period of time. Accordingly, if this method is used in a hydrogen gas driven apparatus, a hydrogen self-contained turbo charger, an electric car or a cogeneration system utilizing such hydrogen self-contained turbo charger etc., the start-up performance of the apparatus or the machine will be improved. In these manners, this method can be put into actual use.

[Other Embodiments]

Next, other embodiments of the invention will be described.

<1> The monometal 1 is not limited to the Mg metal described in the foregoing embodiment. It can be instead any metal having a higher ionization tendency than hydrogen (H) (e.g. potassium (K) metal, sodium (Na) metal, aluminum (Al) metal, manganese (Mn) metal, zinc (Zn) metal, chromium (Cr) metal, cadmium (Cd) metal, iron (Fe) metal, cobalt (Co) metal, nickel (Ni) metal, tin (Sn) metal, lead (Pb) metal) or can be an alloy of such metals having higher ionization tendency than hydrogen.

Figure 4:
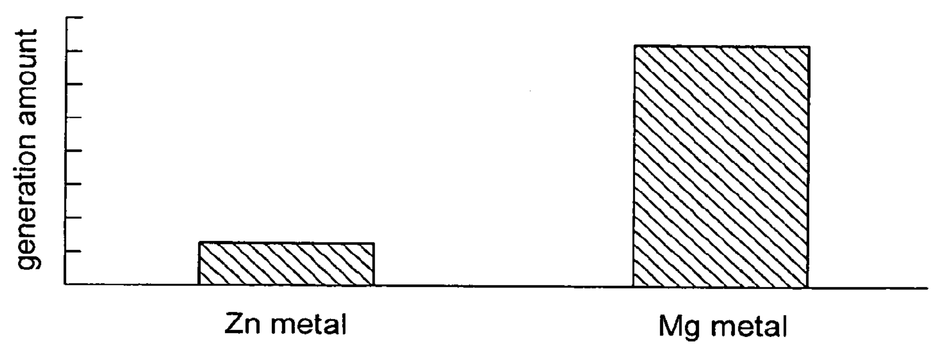
FIG. 4 is a graph showing hydrogen gas generation amounts per a predetermined unit time in comparison between the case using the deuterated sulfuric acid water solution and Mg metal and a further case using the deuterated sulfuric acid water solution and Zn metal.

Incidentally, for an example, FIG. 4 shows the hydrogen generation amounts per a predetermined unit time (min.) in comparison between the case in which Mg metal was immersed in the deuterated sulfuric acid water solution and a further case in which Zn metal was immersed in the deuterated sulfuric acid water solution. In the case of using Mg metal, almost 5.6 times of amount of hydrogen gas could be obtained, compared with the case using Zn metal. For instance, in terms of the mass (for a same surface area) of the metal required for generating 1000 ml of hydrogen gas case, only ⅓ of Mg metal is required relative to the Zn metal required therefor. Hence, if Mg metal is used, it is possible to e.g. reduce the weight of the apparatus employed for implementing the hydrogen gas producing method of the invention.

<2> In the foregoing embodiment, for the generation of hydrogen gas by contacting the deuterated acidic water solution with the monometal, there was described as an example the case in which the monometal is immersed in the deuterated acidic water solution. Needless to say, the method is not limited to such construction shown in FIG. 1 for immersing the entire monometal in the deuterated acidic water solution. Instead, at least a portion of the monometal may be immersed in the deuterated acidic water solution. Further, the method is not limited either to such construction involving immersion of the monometal in the deuterated acidic water solution. Alternately, the required contact between the deuterated acidic water solution and the monometal for hydrogen gas generation can be realized also by spraying the deuterated acidic water solution against the monometal or dripping the deuterated acidic water solution onto the monometal or even by causing the deuterated acidic water solution to flow over the monometal.

Figure 5:
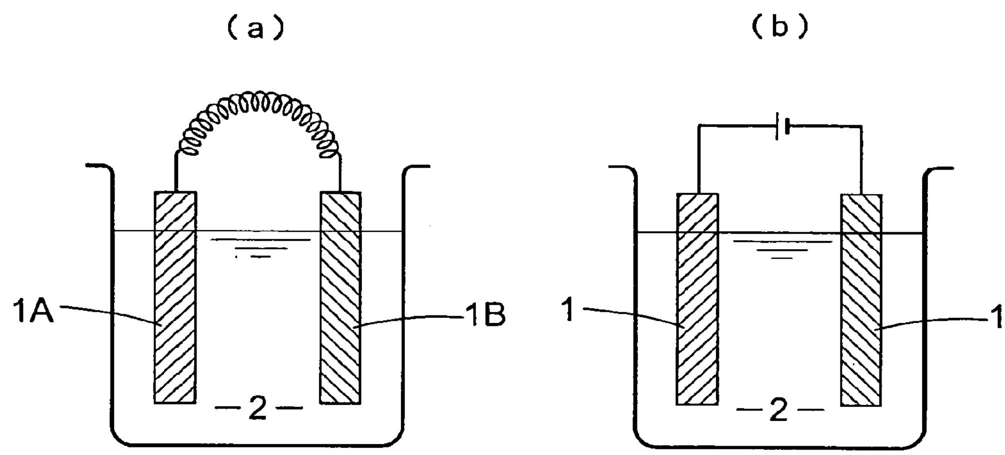
FIG. 5 is an explanatory view in partial section showing an example of contacting condition between a deuterated acidic water solution and a monometal relating to a further embodiment.

<3> Further, as shown in FIG. 5(*a*), different kinds of metals 1A, 1B of differing ionization tendencies may be provided and these different kinds of metals 1A, 1B may be immersed in the solution, with the metals being electrically coupled with each other. Such different kinds of metals 1A, 1B can be appropriately selected from those metals having a higher ionization tendency than hydrogen (H) (K, Na, Mg, Al, Mn, Zn, Cr, Cd, Fe, Co, Ni, Sn, Pb). And, it is preferred that the different kinds of metals having a greater difference in the ionization tendency should be used in combination. For, this results in a greater potential difference, thus further promoting generation of hydrogen gas. Incidentally, FIG. 5(*a*) shows a case in which the different kinds of metals 1A, 1B are coupled via a conducting wire. However, for establishing electrical coupling between the different kinds of metals, other methods are also possible, such as directly bonding the different metals to each other or any other appropriate method may be employed for obtaining the conduction between the different kinds of metals.

Figure 6:
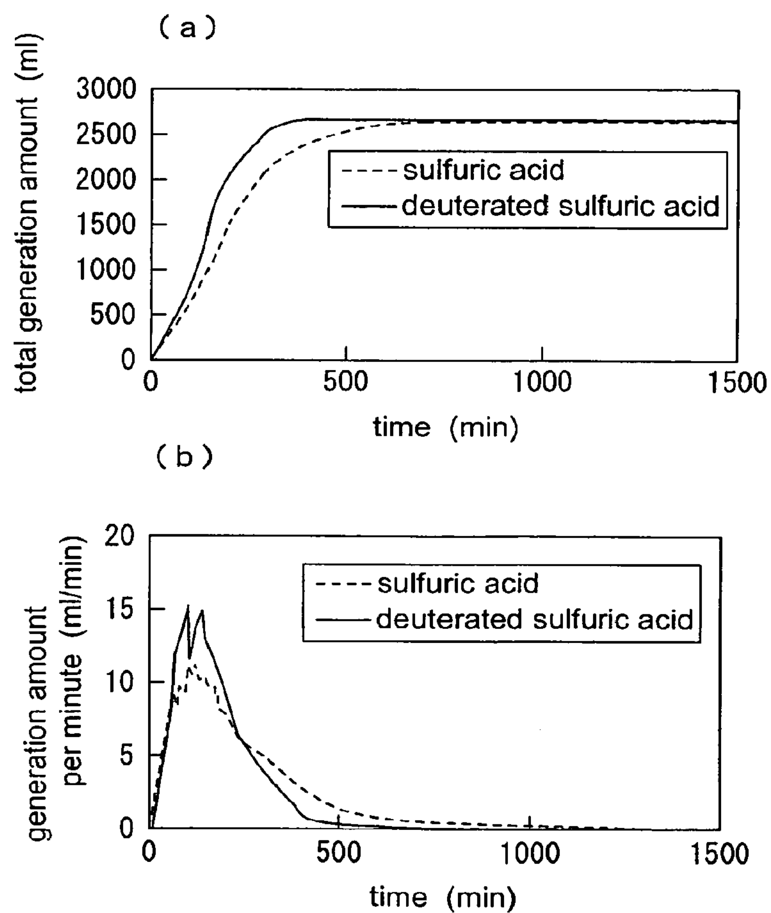
FIG. 6 is a graph showing the hydrogen generation amount relating to a still further embodiment.

As an example of the deuterated acidic water solution, there was prepared deuterated sulfuric acid water solution in which some of hydrogen atoms contained in sulfuric acid solution were substituted for deuterium atoms. And, into 500 ml of this solution, a bonded assembly of a copper metal piece and a zinc metal piece having dimensions of: 50 mm length×50 mm width×1 mm thickness was immersed thereby to generate hydrogen gas. FIG. 6 shows the relationship between the amount of hydrogen gas generated and the time lapsed in this experiment. For comparison, the figure also shows the result of a further case in which the same assembly was immersed in a standard sulfuric acid water solution. In this, the temperature in the water solution was from 15 to 20° C.

FIG. 6(*a*) shows the relationship between the total generation amount of hydrogen gas and the time. As may be understood from this FIG. 6(*a*), the generation rate of hydrogen gas was higher in the case of immersion in the deuterated sulfuric acid water solution than the case of immersion in the standard sulfuric acid water solution. For more detailed understanding, FIG. 6(*b*) shows the hydrogen gas generation amount per unit time. From this FIG. 6(*b*), it is understood that during the early period after the immersion in the water solution, the immersion in the deuterated sulfuric acid water solution generated about 1.5 times amount of hydrogen gas relative to the immersion in the standard sulfuric acid water solution.

Figure 7:
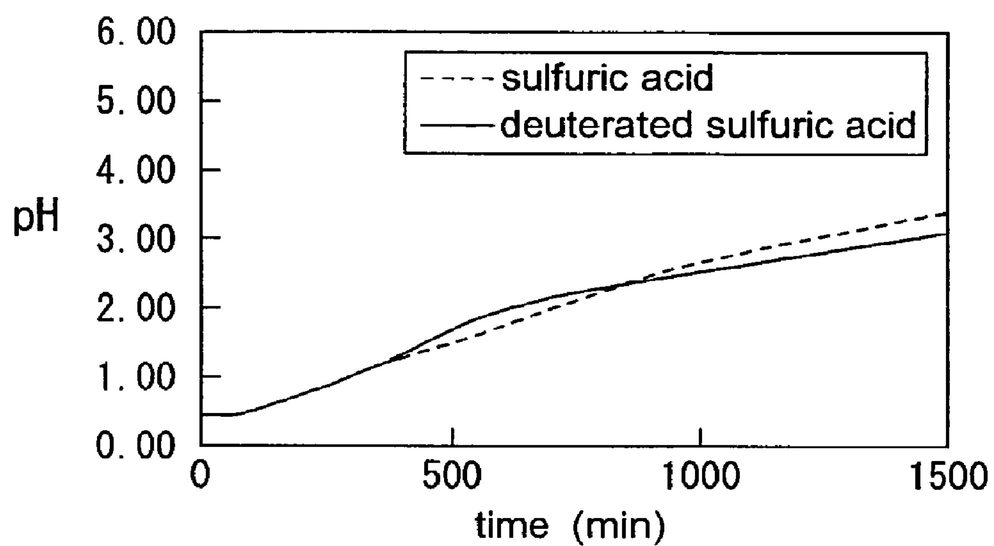
FIG. 7 is a graph showing pH variation in the deuterated sulfuric acid water solution relating to a still further embodiment, and FIG. 8 a graph showing the hydrogen generation amount relating to a still further embodiment.

FIG. 7 shows the determination of pH variation in the water solution in the above experiment. From FIG. 6 and FIG. 7, it is understood that the hydrogen gas was generated rapidly under the condition of pH 1.0 or lower. Further, in the time period under such condition (~about 400 (min)), the deuterated sulfuric acid water solution showed similar pH variation to that of the standard sulfuric acid water solution. Then, it is understood and confirmed that for a same condition, the deuterated sulfuric acid water solution could generate a greater amount of hydrogen gas in a shorter period of time than the standard sulfuric acid water solution.

Figure 8:
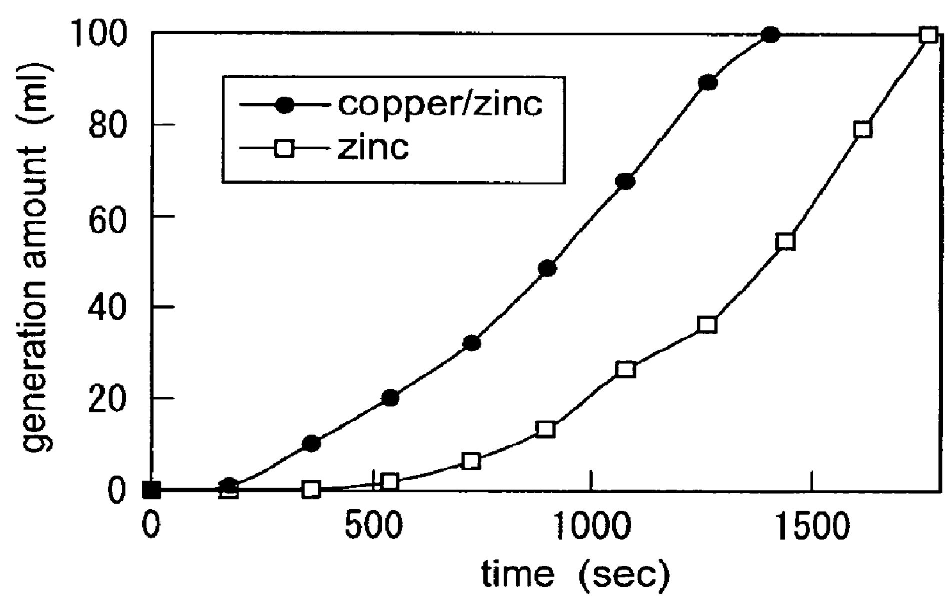

Incidentally, FIG. 8 shows a difference in the hydrogen generation amounts between a case immersing an assembly of copper and zinc (for both copper and zinc, a metal piece having dimensions of: 50 mm length×50 mm width and 1 mm thickness) and a further case immersing only zinc (two pieces of the metal pieces having the dimensions of 50 mm length×50 mm width and 1 mm thickness). From this FIG. 8, it is understood that the combination of different kinds of metals having differing ionization tendencies can yield a greater amount of hydrogen gas.

<4> Further, as the monometal, a plurality of pieces of monometal 1 can be prepared and these maybe immersed in the deuterated acidic water solution 2 with establishing a potential difference between the plurality of monometal 1 pieces by means of an external power source (see FIG. 5(*b*)). With this, the monometal 1 piece having the lower electric potential will act as an anode, thereby to electrochemically promote the oxidation reaction, so that a greater amount of hydrogen gas can be generated in an even shorter period of time. Further alternately, one monometal piece and another metal may be immersed in the deuterated acidic water solution with a potential difference between the monometal 1 and the other metal by means of an external power source so that the monometal 1 has the lower electric potential. Such other metal can be appropriately selected from those which are conductive to the monometal which is to be provided with the lower electric potential by the external power source.

<5> In the foregoing embodiment, the acidic water solution comprises the sulfuric acidic water solution. Instead, any inorganic acid such as hydrochloric acid, and nitric acid, etc or any organic acid such as citric acid, glycine, cinnamic acid, succinic acid, salicylic acid, formic acid, glutamic acid, ascorbic acid, oxalic acid, tartaric acid, lactic acid, acetic acid, etc. may be employed. With the present invention, by its deuteration, even an organic acid having a relatively low acidity can generate a sufficient amount of hydrogen gas.

Further, two kinds or more of such inorganic or organic acids can be used. Or, an inorganic acid and an organic acid may be used in combination.

INDUSTRIAL APPLICABILITY

With the hydrogen gas producing method relating to the present invention, it becomes possible to generate a great amount of hydrogen gas in a short period of time. Accordingly, if this method is used in a hydrogen gas driven apparatus, a hydrogen self-contained turbo charger, an electric car or a cogeneration system utilizing such hydrogen self-contained turbo charger or for supply of hydrogen gas for a fuel cell, the start-up performance of the apparatus or the machine will be improved. In these manners, this method can be put into actual use.

The invention claimed is:

1. A method for producing hydrogen gas, comprising the step of contacting a monometal with deuterated acidic water solution in which at least some of hydrogen atoms contained in acidic water solution are substituted for deuterium atoms, thereby to generate hydrogen gas.

2. The method for producing hydrogen according to claim 1, wherein said acidic water solution contains at least one kind of acid selected from the group consisting of citric acid, glycine, cinnamic acid, succinic acid, salicylic acid, formic acid, glutamic acid, ascorbic acid, oxalic acid, tartaric acid, lactic acid, acetic acid, sulfuric acid, hydrochloric acid, and nitric acid.

* * * * *